United States Patent
Pancotti

(10) Patent No.: US 6,910,865 B2
(45) Date of Patent: Jun. 28, 2005

(54) HELICOPTER ROTOR HUB, AND ROTOR FEATURING SUCH A HUB

(75) Inventor: Santino Pancotti, Gallarate (IT)

(73) Assignee: Agusta S.p.A., Samarate (IT)

( * ) Notice: Subject to any disclaimer, the term of this patent is extended or adjusted under 35 U.S.C. 154(b) by 50 days.

(21) Appl. No.: 10/457,822

(22) Filed: Jun. 10, 2003

(65) Prior Publication Data

US 2004/0037701 A1 Feb. 26, 2004

(30) Foreign Application Priority Data

Jun. 14, 2002 (IT) ..................................... TO2002A0509

(51) Int. Cl.$^7$ .............................................. B64C 11/02
(52) U.S. Cl. ............................ 416/210 R; 416/134 A
(58) Field of Search ............................... 416/244 R, 24, 416/134–143, 114, 106–107, 210 R

(56) References Cited

U.S. PATENT DOCUMENTS

| 3,606,575 | A | | 9/1971 | Lermusiaux |
| 3,941,503 | A | * | 3/1976 | Bruel .......................... 416/141 |
| 4,342,540 | A | | 8/1982 | Lovera et al. |
| 4,568,245 | A | * | 2/1986 | Hibyan et al. .......... 416/134 A |
| 4,808,075 | A | * | 2/1989 | Pariani et al. ............... 416/140 |
| 4,868,962 | A | | 9/1989 | McArdle et al. |
| 4,915,585 | A | * | 4/1990 | Guimbal ...................... 416/140 |
| 5,409,183 | A | * | 4/1995 | Gunsallus ................ 244/17.13 |
| 6,032,899 | A | * | 3/2000 | Mondet et al. .......... 244/17.25 |
| 6,200,097 | B1 | | 3/2001 | Mouille |

FOREIGN PATENT DOCUMENTS

| DE | 1966039 | 9/1971 |
| EP | 0 362 117 | 4/1990 |

* cited by examiner

Primary Examiner—Ninh H. Nguyen
(74) Attorney, Agent, or Firm—Liniak, Berenato & White

(57) ABSTRACT

There is described a hub for a helicopter rotor, having a main body, and a number of connecting members projecting from the main body and for the connection of respective blades; the main body and the connecting members being defined by separate components connectable to one another by releasable fastening means.

7 Claims, 2 Drawing Sheets

HELICOPTER ROTOR HUB, AND ROTOR FEATURING SUCH A HUB

The present invention relates to a helicopter rotor hub, in particular for a tail rotor, to which the following description refers purely by way of example.

BACKGROUND OF THE INVENTION

As is known, a helicopter tail rotor substantially comprises a hub connected angularly to the rotor drive shaft, and a number of blades fixed to and projecting radially from the hub.

The hub typically comprises a substantially cylindrical central body, in turn comprising an axial through hole for the drive shaft, and a number of integral outer radial supporting arms, each defining a fastening seat for connection of a respective blade.

Each blade is normally fitted on one end with a fastening member for connection to a relative arm on the hub. More specifically, the fastening member is typically C-shaped, and comprises opposite parallel end portions connected releasably to one end of the relative blade to define a closed through seat with the blade, and a connecting portion for connecting the end portions and fitted through the fastening seat of the relative arm on the hub.

Known hubs of the above type are extremely bulky and heavy, and therefore difficult to manage when fitting and removing the rotor to and from the helicopter. This is mainly due to the supporting arms, which greatly increase the radial size of the hub.

SUMMARY OF THE INVENTION

It is an object of the present invention to provide a helicopter rotor hub designed to eliminate, in a straightforward, low-cost manner, the aforementioned drawback typically associated with known hubs.

According to the present invention, there is provided a hub for a helicopter rotor, comprising a main body, and a number of connecting members projecting from said main body and for the connection of respective blades; characterized in that said main body and said connecting members are defined by separate components connectable to one another by releasable fastening means.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
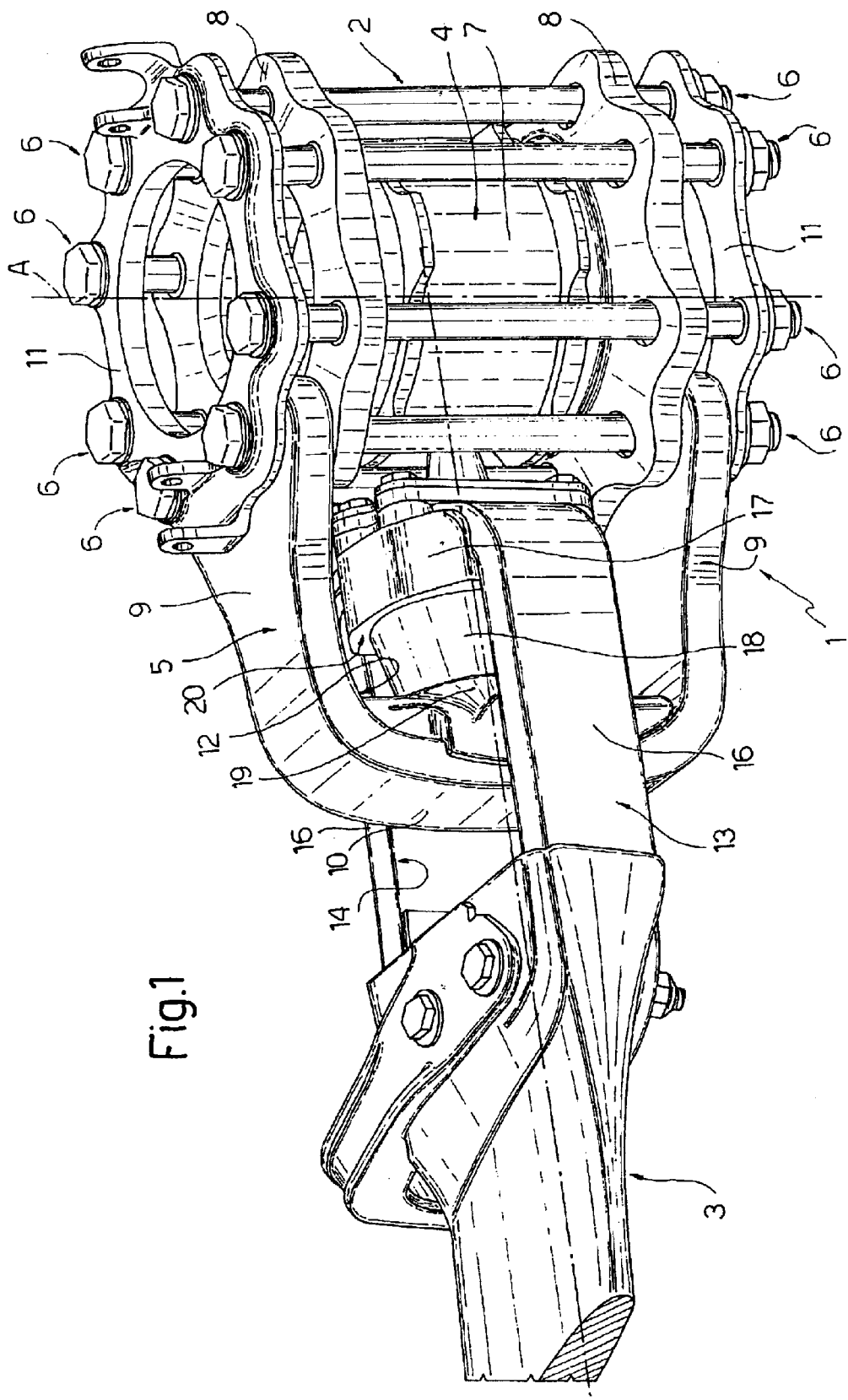
FIG. 1 shows a view in perspective, with parts removed for clarity, of a helicopter rotor hub in accordance with the present invention.
Figure 2:
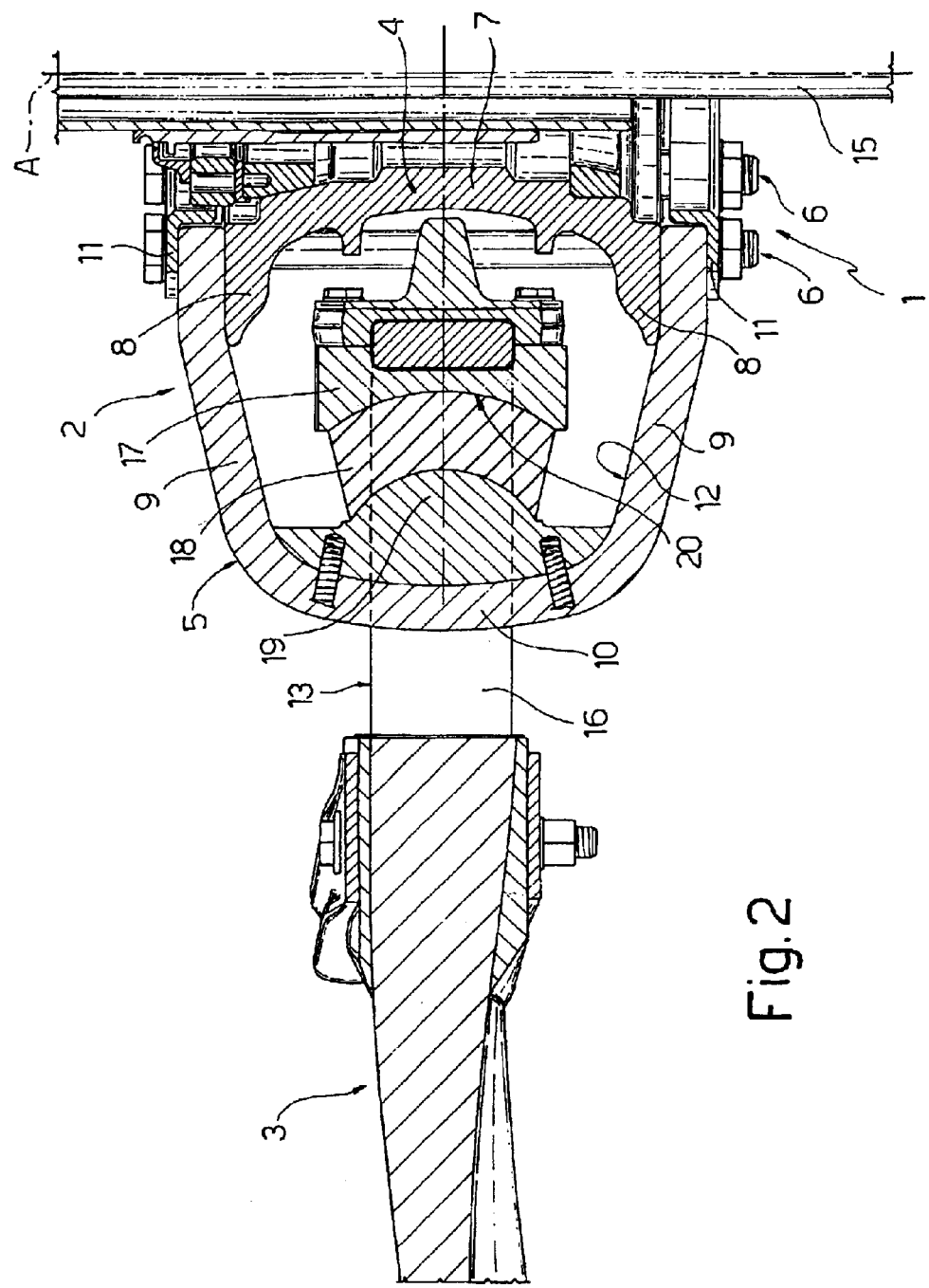
FIG. 2 shows a cross section of the FIG. 1 hub.

With reference to the accompanying drawings, number 1 indicates as a whole a rotor—in the example shown, a tail rotor—for a helicopter (not shown), and which substantially comprises a hub 2, of axis A, connected angularly to a drive shaft 15 (shown partly in FIG. 2) of rotor 1; and a number of blades 3 (only one of which is shown partly) fixed radially to and projecting from hub 2 in the manner described below and which constitutes the object of the present invention.

More specifically, hub 2 comprises a hollow, substantially cylindrical, central body 4, of axis A, for receiving and rotated by drive shaft 15 in known manner not described; and a number of connecting members 5 projecting radially from body 4 and for the connection of respective blades 3.

An important characteristic of the present invention is that body 4 and connecting members 5 are defined by separate components connected to one another releasably by a number of bolts 6.

More specifically, body 4 comprises a cylindrical main portion 7 of axis A; and opposite annular end flanges 8 projecting radially from main portion 7.

Each connecting member 5 is substantially C-shaped, and is defined by two facing arms 9 joined by a transverse connecting portion 10 and fixed at their free ends to body 4 by means of bolts 6.

More specifically, the free ends of arms 9 of each connecting member 5 rest on respective flanges 8 of body 4, and are gripped between flanges 8 and respective annular end plates 11. Flanges 8 are fastened to annular plates 11 by means of bolts 6, which have axes parallel to axis A and are equally spaced angularly about axis A and outwards of the main portion of body 4.

Each connecting member 5 defines, with the portion of body 4 facing it, a closed seat 12 for receiving relative blade 3.

As shown in the accompanying drawings, each blade comprises, at one end, a portion 13 for connection to hub 2 and defining a closed through opening 14 through which connecting portion 10 of relative connecting member 5 extends.

More specifically, portion 13 of each blade 3 is substantially C-shaped with opposite ends originating from the body of blade 3; and the C's formed by each connecting member 5 and by portion 13 of each blade 3 lie in planes perpendicular to each other.

Each portion 13 is defined by two substantially parallel branches 16 forming extensions of relative blade 3 and joined by a transverse connecting portion 17.

Each connecting member 5 is connected to portion 13 of each blade 3 by means of a bearing 18 allowing blade 3 to move in all possible planes.

More specifically, connecting portion 10 of each connecting member 5 and connecting portion 17 of portion 13 of relative blade 3 respectively comprise a convex projection 19 and a concave recess 20, between which bearing 18 is housed.

The advantages of rotor 1 and hub 2 according to the present invention will be clear from the foregoing description.

In particular, hub 2 according to the invention is easier to manage when being fitted to the helicopter, by being defined by a number of separate, relatively small, lightweight parts (main body 4 and connecting members 5).

Clearly, changes may be made to rotor 1 and hub 2 as described and illustrated herein without, however, departing from the scope of the accompanying claims.

What is claimed is:

1. A hub (2) for a helicopter rotor (1), comprising a main body (4), and a plurality of connecting members (5) projecting radially from said main body (4) and defining, with said main body, a closed-profile seat for receiving a respective blade (3); characterized in that each connecting member (5) is defined by a component separated from said main body and connectable to the main body by releasable fastening means (6).

2. A hub as claimed in claim 1, wherein each said connecting member (5) is substantially C-shaped, and comprises two facing arms (9) joined by a transverse connecting portion (10) and fixed at their free ends to said main body (4) by said releasable fastening means (6).

3. A hub as claimed in claim 1, wherein said main body (4) is substantially cylindrical.

4. A hub as claimed in claim 3, wherein said main body (4) defines integrally, at opposite axial ends, respective radial flanges (8) for supporting and fastening respective said free ends of each said connecting member (5).

5. A hub as claimed in claim 4, wherein said releasable fastening means comprise a number of bolts (6) having axes parallel to the axis of said main body (4), and connecting said free ends of each said connecting member (5) to said flanges (8).

6. A helicopter rotor (1) comprising a hub (2), and a number of blades (3) extending radially from said hub (2), wherein said hub (2) is formed as claimed in claim 1, and wherein each said blade (3) comprises a connecting portion (13) for connection to said hub (2) and defining a through opening (14) through which said connecting portion (10) of the relative said connecting member (5) extends.

7. A rotor as claimed in claim 6, comprising bearing means (18) interposed between said connecting portion (13) of each said blade (3) and said connecting portion (10) of the relative said connecting member (5).

* * * * *